April 4, 1961 A. W. JENIKE 2,978,095
ELEVATING BELT CONVEYOR FOR DISCRETE MATERIALS IN BULK
Filed Jan. 16, 1958 2 Sheets-Sheet 1
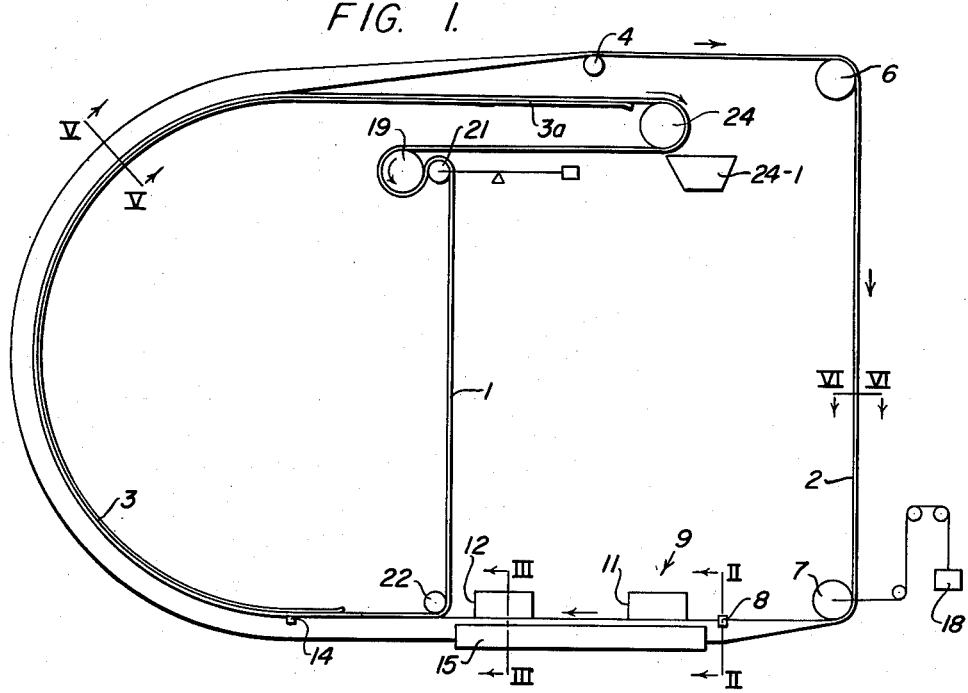
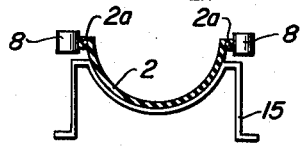
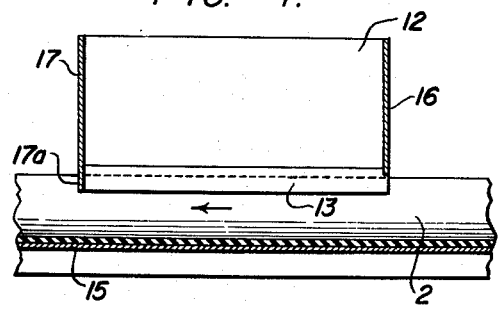
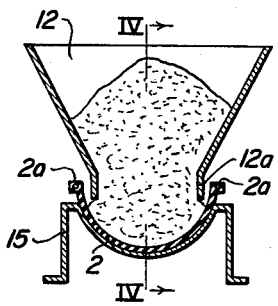
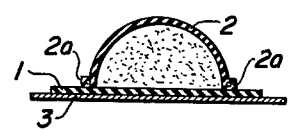
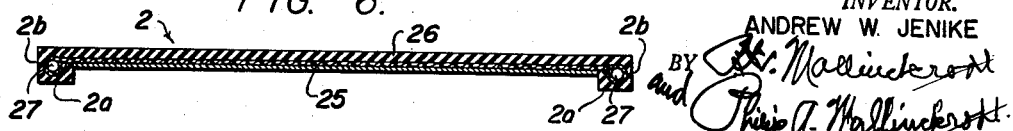
INVENTOR.
ANDREW W. JENIKE
BY
ATTORNEYS April 4, 1961  A. W. JENIKE  2,978,095
ELEVATING BELT CONVEYOR FOR DISCRETE MATERIALS IN BULK
Filed Jan. 16, 1958  2 Sheets-Sheet 2
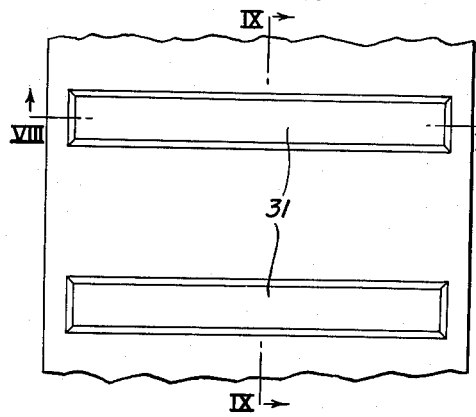
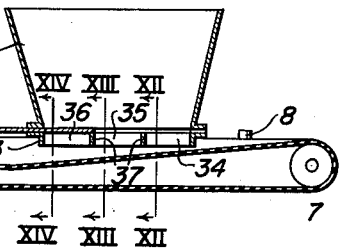
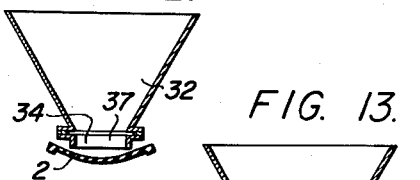
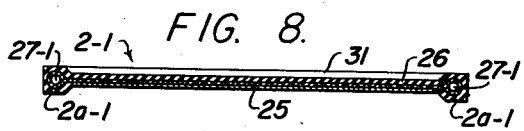
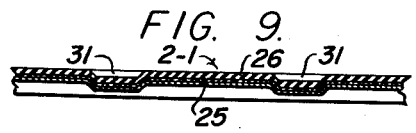
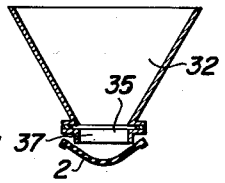
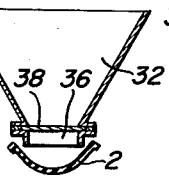
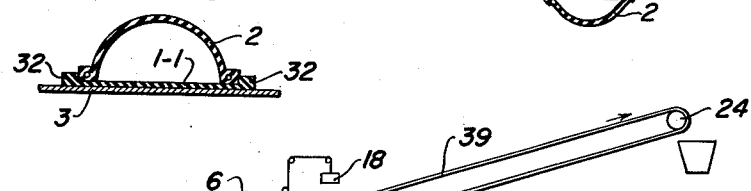
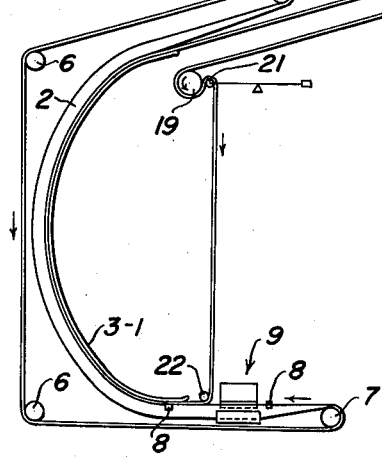
INVENTOR:
ANDREW W. JENIKE,
BY *G. H. Mallinckrodt*
and *Philip A. Mallinckrodt.*
ATTORNEYS.

United States Patent Office 2,978,095
Patented Apr. 4, 1961

2,978,095
ELEVATING BELT CONVEYOR FOR DISCRETE MATERIALS IN BULK
Andrew W. Jenike, 1846 E. 9th S., Salt Lake City, Utah
Filed Jan. 16, 1958, Ser. No. 709,304
8 Claims. (Cl. 198—165)

This invention relates to elevating conveyors for transporting materials along vertical or steeply inclined paths as well as along those which are horizontal or only moderately inclined. It is particularly concerned with the handling of discrete materials in bulk, such as flour, sand, coal, ore, metallurgical concentrates, and various chemicals.

Although there have been a variety of elevating conveyors developed for this purpose, the present invention is concerned with a type broadly characterized by its use of two endless conveyor belts arranged to travel in face-to-face confronting relationship along at least vertical or steeply inclined portions of a material-conveying path, with the conveyed material grasped and held therebetween.

Such special belt conveyors have been developed previously for carrying articles like newspapers and lumps of dough, where there is little or no tendency for the articles to escape from the grasp of the belts. However, attempts have been made to adapt this type of conveyor to the handling of discrete materials in bulk, which presents the very real problem of preventing leakage of material from between the two belts while insuring adequate conveying action with respect to such material.

The present invention is concerned with effectively solving this problem by means of relatively simple and inexpensive apparatus which will operate satisfactorily over long periods of time with little attention.

It is concerned, also, with the provision of apparatus for handling various kinds of such discrete materials, for example, materials that are dry and free flowing, or those that are sticky and adherant, as well as materials that are quite hot, or abrasive, or materials that are friable so as to require very gentle handling.

A principal object of the invention, therefore, is to provide a versatile, relatively inexpensive, easily maintained belt-conveyor apparatus of the type employing two belts which operate in material-retaining, face-to-face confronting relationship over a vertical or steeply inclined portion of a material-conveying path.

A more specific object is to provide belt construction and arrangement capable of positively retaining and of conveying loose, discrete material in bulk without the need for special mechanical sealing rolls or the like.

Features of the invention in the attainment of these objects are the provision of a special troughing belt for carrying the material along a vertical or steeply inclined portion of a material-conveying path, and of guide means establishing a novel line of travel for both belts along such portions of the path, so that the necessary sealing engagement and conveying action of these belts with respect to the material is assured; and the provision of a complete belt conveyor system incorporating such belts and guide means, together with means for troughing the troughing belt at appropriate times, means for feeding material into the troughed belt, means for transferring the material from the troughed belt to the cover belt at the upper end of such vertical or steeply inclined portion of the material-conveying path, means for driving the belts, and means for maintaining the belts under tension.

According to the invention the conveyor system involves separate endless belts traveling over and around an elongate, convexly arcuate, guide member, one of the belts overlying the other so that the two belts are disposed in working-face to working-face, confronting relationship along the length of such guide member.

The guide member is advantageously a stationary slideway, while the inner belt is usually a conventional, flat, conveyor belt which slidably engages the guide member. The outer belt is the troughing belt. Its lateral margins contact the outer surface of the inner belt, while its mid-portion bellies out to define a material-retaining trough closed by the inner belt.

To insure against escape and loss of the material being conveyed, especially where such material is loose and free-flowing, it is essential that there be a tight, sealing engagement between the two belts. The manner in which this is achieved is an important feature of the invention. Thus, the outer or troughing belt is specially formed so that its lateral margins are in tension as the belts round the arcuate guide member, but the bellied out mid-portion is not. In fact, it is capable of expanding longitudinally to relieve tension that would otherwise be imparted.

As will be seen later, this ability of the mid-portion of the outer or troughing belt to expand longitudinally relative to the lateral margins thereof can be achieved in various ways. For example, the lateral margins may be longitudinally reinforced by respective endless lengths of strong cable, cord, or the like which are shorter than the belt proper and are, in effect, pre-stressed, being in tension while the rubber is in compression. Again, the lateral margins may be strongly reinforced in some manner and the mid-portion corrugated in some fashion transversely of the length of the belt.

With such a troughing belt, it will be readily appreciated that any tension or pull exerted upon it as it rounds the curved guide member will draw its lateral margins taut relative to its mid-portion and will establish mutually opposite lines of contact sealing against the inner belt which it overlies. Moreover, it can be easily seen that, with appropriate expansion provided for the mid-portion of the belt, the material held within the trough formation is subject to only gentle pressures.

The tension or pull on the outer, troughing belt is advantageously insured by counterweighting the belt through an ordinary take-up pulley, and it is also advantageous that the inner, cover belt be counterweighted.

Further objects and features of the invention will become apparent from the following detailed description of the several preferred embodiments illustrated by way of example in the accompanying drawings.

In the drawings:

Fig. 1 represents a schematic view in side elevation of a complete belt conveyor system embodying principles and features of the invention;

Figs. 2 and 3, transverse sections taken along the lines II—II and III—III, respectively, of Fig. 1 and drawn to a considerably enlarged scale;

Fig. 4, a fragmentary longitudinal section taken along the line IV—IV of Fig. 3;

Fig. 5, a transverse section taken along the line V—V of Fig. 1 and drawn to the enlarged scale of Figs. 2–4;

Fig. 6, a transverse vertical section taken through one form of special troughing belt attributable to the invention, the belt being in its flat, untroughed condition as it is, say, at the line VI—VI of Fig. 1 and the view being drawn to a scale considerably enlarged over that of the preceding figures;

Fig. 7, a fragmentary plan view of a different form of troughing belt in its untroughed condition; the view being drawn to the enlarged scale of Fig. 6;

Figs. 8 and 9, transverse and longitudinal sections, respectively, taken along the lines VIII—VIII and IX—IX of Fig. 7;

Fig. 10, a transverse sectional view similar to that of Fig. 5, but showing a somewhat different form of cover or closing belt;

Fig. 11, a fragmentary longitudinal vertical section taken centrally through a special feed hopper drawn to a scale enlarged over that of Fig. 1 but reduced relative to that of Figs. 2–4;

Figs. 12, 13 and 14, transverse vertical sections taken along the lines XII—XII, XIII—XIII, and XIV—XIV, respectively, of Fig. 11; and Fig. 15, a view similar to that of Fig. 1, but illustrating a different layout for the conveyor belts and other components of the system.

Referring to the drawings:

The system of Fig. 1 includes inner and outer conveyor belts 1 and 2, respectively, belt 1 being the trough-closing or cover belt and belt 2 being the troughing belt.

The endless path of travel of the outer or troughing belt 2 is defined by various supporting pulleys and by an arcuate guide member 3 over which inner belt 1 is trained, the pulleys here comprising idler pulleys 4 and 6 and take-up pulley 7. Guide member 3 is preferably a slide plate.

Belt 2 is substantially flat in its passage over the pulleys, but passes between a pair of laterally placed troughing rollers 8 prior to passage through a feed designated generally as 9. The effect of these rollers 8 is illustrated in both Figs. 1 and 2. They bear against the side of the belt and force it into trough formation. For reasons to be explained, these troughing rollers 8 are preferably disposed in close proximity to the feed station.

Feed station 9 includes, in this instance, a pair of feed hoppers 11 and 12, each of which has an elongate and narrow outlet member, see 12a, Fig. 3, of sufficient downward projection to extend into the upper part of the troughed belt 2. Also disposed at the feed station and extending beneath both of the hoppers 11 and 12 is a rigid supporting trough 15, through which the troughed belt passes after leaving the rollers 8. Such trough 15 supports the belt during feeding. Moreover, in its extension almost to arcuate guide member 3, it tends to maintain the desired trough formation of the belt.

A structural feature of the second feed hopper 12 appears in Fig. 4. Its forward wall 16 terminates sufficiently high above the belt to clear the material deposited by the first hopper 11, while its rearward wall 17 depends to a lower level, providing a lip 17a which is still above the discharge lip level of the outlet member of the first hopper 11. Such lip 17a controls the amount of material deposited on the conveyor by the second feed hopper 12.

From feed station 9, the troughed and loaded belt 2 passes around slide plate 3. The trough formation is maintained by a second pair of troughing rollers 14 near the lower end of the slide plate. Between the slide plate and pulley 4 the belt flattens for its return run to feed station 9.

Troughing belt 2 is tensioned by suitable means, such as counterweight arrangement 18 attached to take-up pulley 7.

Inner belt 1 has its path of travel defined by a drive pulley 19, a counterweighted take-up pulley 21, a training pulley 22, slide plate 3, and head pulley 24. Thus, slide plate 3 provides a common path for the belts 1 and 2, the respective paths of these belts otherwise running separately.

Within and along such common path, a principal function of belt 1, namely, to tightly close or cover troughed belt 2 during elevation of material deposited thereon, is carried out. To achieve this purpose, belt 1 joins belt 2 at training pulley 22, which, as may be noted, is located a short distance ahead of the slide plate. The two belts then proceed around the slide plate, with inner belt 1 bearing against and sliding upon such slide plate and with the lateral margins 2a, Fig. 5, of troughed outer belt 2 pressed tightly against inner belt 1. Preferably, as shown, inner or closing belt 1 is wider than the maximum trough width, so as to permit some lateral movement without interference with proper functioning.

Upon reaching the upper limit of curvature of slide plate 3, troughed belt 2, due to the higher elevation of its pulley 4, leaves closure belt 1 tangentially, while such closure belt continues along the horizontal portion 3a of the slide plate to head pulley 24. Because of the inversion of troughing belt 2 as it rounds slide plate 3, it transfers its contents to belt 1, which then conveys the material to discharge at 24–1 in customary manner.

Such being the general arrangement, it is to be specially pointed out that troughing belt 2, in its upward travel around slide plate 3, is entirely free of such mechanical force as might be applied by pressure rolls, tubular casings, or the like, for pushing it into tight, material-retaining contact against its companion belt 1. However, it is essential that a tight seal be established between belts 1 and 2. The manner in which this is accomplished is an important feature of the invention.

There are two principal factors contributing to the creation of this seal, the first of these being the employment of a particular type of carrying belt 2, and the second being the use of the slide plate radius in conjunction with applied belt tension for sealing purposes. Belt 2 is specially formed to have taut lateral margins and a relatively slack central portion, the concept being that, when such a belt is troughed and pulled around a radius, the taut margins will be drawn into tight sealing engagement with the underlying closing belt, while the slack mid-portion remains relatively untensioned and capable of expanding longitudinally so as to compensate for any tendency to flatten in response to the pull.

The special troughing belt 2 may be formed in various ways, as exemplified by the different embodiments of Fig. 6 and Figs. 7–9.

Referring first to the embodiment of Fig. 6, the belt structure comprises a laminated carcass 25 made up of layers of fabric, as is usual in the conveyor belt art, and a cover 26 of wear-resistant rubber. Such cover 26 extends entirely over one broad face, over the lateral or edge faces, and over lateral margins of the other broad face of the carcass. The particular fabric as well as the relative thickness of carcass and cover are matters of choice, depending in part at least upon the type of material to be conveyed. All are bonded together, as by vulcanization in the usual manner.

The belt is preferably of uniform thickness across its mid-portion, but is considerably thicker along its lateral margins 2a, within which are embedded respective tension elements, such as the cables 27. Chains, cords, wire, and similar flexible, reinforcing material may also be satisfactorily employed as the tension elements.

The rubber cover 26 provides the trough surface upon which the material is deposited, as well as sealing surfaces 2b coextensive with the lateral or edge faces of the belt. These serve not only to establish lines of seal along opposite lateral margins of conveyor belt 1 in rounding the slide plate 3, see Fig. 5, but also, in the system of of Fig. 1, serve to drive belt 2, by frictional engagement with driven belt 1.

Because the trough formed by troughing belt 2 is entirely rubber lined, hot and abrasive materials may be elevated as easily as they are conveyed by any standard belt conveyor.

Although the cables 27 are embedded in the body of troughing belt 2, care is taken that they are not bonded to the belt. Their function is to take the tension imparted by counterweighted take-up pulley 7 as the belt rounds arcuate slide plate 3. This is provided for by making such cables shorter than the belt proper, one way of accomplishing this being by appropriately cutting off ends of the embedded cables after fabrication of the belt length but before joining the belt and embedded cables into a closed loop. This places the cables in tension and the belt proper in compression, and means that, in effect, the lateral margins 2a of belt 2 are taut relative to the mid-portion thereof. Such mid-portion can expand longitudinally, even though the lateral margins are tensioned and tightly pressed against the cover or closure belt 1 during travel of the belts around the radius of slide plate 3.

In this construction of the troughing belt 2, the cables 27 should in general be approximately 0.25% to 2% shorter than the belt proper, depending upon the radius of the slide plate. The greater the radius, the less the shortening of the cables.

The construction for the troughing belt shown in Figs. 7–9 (designated 2–1) also makes use of cables (designated 27–1) embedded in the lateral margins of the belt, but these are equal in length with such margins and may be bonded to the material of the belt if desired.

While cables 27–1 are tensioned during travel of the belt around the radius of slide plate 3, so also are the respective lateral margins of the belt. The mid-portion of the belt is free to expand longitudinally, because of a longitudinal series of transverse corrugations 31 provided at intervals along the length of such mid-portion, see particularly Figs. 7 and 9. In effect, then, the margins of the belt are taut relative to the mid-portion.

The expansion permitted by the flattening of the corrugations 31 as the belt travels around slide plate 3 means that the cables 27–1 and the margins 2a–1 of the belt are strongly tensioned while the mid-portion of the belt is relatively untensioned.

Further assurance of a tight seal with either of the above belt constructions can be had by the modified cover or closing belt 1–1 of Fig. 10. As there shown, the belt 1–1 is provided with rim portions 32, between which the lateral margins 2a of the troughed belt 2 closely fit. Such a specially formed cover or closing belt is particularly suited for the transporting of materials that are essentially free flowing.

Another important feature of the invention involves the operation of feeding material into the troughed belt 2 or 2–1 when the feed is directly from a single storage hopper or bin.

Under such circumstances, a smooth and even feed is obtained by gradually forming the trough of belt 2 as such belt passes beneath a long slot opening formed by the outlet member of the hopper.

As seen in Fig. 11, a special feed hopper construction is employed. Thus, feed hopper 32 of Fig. 11 has an elongate outlet member 33 divided into a plurality of channels 34, 35, and 36 by a series of downwardly-projecting and transversely disposed scraper members 37.

The gradual formation or progressive deepening of the trough as belt 2 passes beneath the hopper 32 is effected by placing the side rollers 8 in close proximity to the hopper. Thus, as indicated in Figs. 11–14, when the side rollers are so disposed, the formation of the trough commences almost immediately after the troughing belt leaves take-up pulley 7, and, more important, its formation is not fully completed until the end point of the hopper feed has been reached. In other words, as seen in the drawings, the belt gradually assumes its troughed shape beneath the hopper.

Scrapers 37 project downwardly into the trough, so as to contact and scrape the top of the trough contents being transported. To control the feeding operation, a sliding gate 38 is mounted in the hopper side walls and across outlet member 33 for closing action relative to the several channels 34, 35, and 36. As shown in Fig. 11, the gate is closing off channel 36.

The advantages obtained through such an arrangement can be readily appreciated. Thus, in a conventional arrangement in which a completely formed trough is passed beneath a long, open, feed slot, it is quite difficult to obtain a uniform material flow, because the material tends to feed either at one or the other end of the slot. The rest of the material then remains stationary for long periods of time, with the results that it tends to compact and to arch. In the present arrangement, however, the gradual increase in trough depth, coupled with the provision of successive scraper members 37 and outlet channels 34, 35, and 36, means that the cross-sectional areas between the lower edges of the respective scrapers and the inside surface of the troughed belt increases progressively and by steps in the direction of belt travel, see Figs. 12, 13, and 14. Such a stepped increase has been found to assure even and constant flow through every channel. In addition, as already stated, sliding gate 38 permits control of the rate of feed.

Fig. 15 illustrates a modified arrangement of the system as an indication that many different arrangements may be made within the scope of the invention. It functions in the same manner as the arrangement of Fig. 1, and elements common to both arrangements are identified by the same reference characters.

The major point of departure lies in the fact that troughing belt 2 is back-tracked, while closing belt 1 carries the material over an extended and moderate incline 39 in the manner of a conventional belt conveyor. Also, to illustrate the fact that the curvature of the slide plate is not critical provided the radius is not too great for sealing purposes, such slide plate, here indicated 3–1, is shown with a varying curvature designed for the saving of space. The drive for the belts is a drive pulley 19, as in Fig. 1. However, it is entirely feasible to directly drive troughing belt 2 instead of cover or closing belt 1, in which event belt 1 would be driven through its frictional engagement with the troughing belt, or both belts may be driven independently but in synchronism.

With respect to all embodiments of the invention, the simplicity of construction and arrangement is outstanding as compared with conventional means for accomplishing similar results. A minimum number of parts arranged in a manner that requires relatively little maintenance is characteristic. This makes for low initial and upkeep costs.

While it is usually desirable to utilize the inner cover or closing belt in conjunction with the troughing belt as hereinbefore described, it should be realized that this is not always necessary. If the lateral sealing surfaces of the troughing belt are substantially non-frictionally faced, as by the application of a slipping material thereto, so as to slide upon the slide plate, or if the slide plate itself is made to travel with the troughing belt, as would be the case if it were a wheel, the troughing belt could be used by itself for elevating the discrete, bulk materials with which this invention is especially concerned.

Whereas the invention is here illustrated and described with respect to presently preferred forms thereof, it should be understood that various changes may be made without departing from the inventive concepts nor the scope of the claims which here follow.

I claim:

1. A belt conveyor for elevating bulk discrete solids, comprising inner and outer, concurrently traveling, conveyor belts, the outer belt being formed with taut lateral margins and relatively relaxed mid-portion and the inner belt being flat; a guide member having an elongate, longitudinally arcuate, convex, guide surface defining the elevating path of travel for said belts, the inner belt extending around and engaging said guide surface and the outer belt extending around the inner belt with its taut margins engaging the outer surface of said inner belt; and means for tensioning the outer belt relative to said guide surface so as to draw the taut margins of the outer belt into tight sealing engagement with said outer surface of the inner belt throughout substantially the longitudinal extent of said guide surface while leaving the mid-portion of the outer belt relatively untensioned and bellied out as a material container capable of longitudinal expansion during belt travel along said guide surface.

2. The apparatus of claim 1, wherein the outer belt is a troughing belt, and means are provided for troughing said outer belt in advance of the lower end of the guide member.

3. The apparatus of claim 2, wherein the troughing belt is longitudinally reinforced at respective lateral margins with endless tension means.

4. The apparatus of claim 3, wherein the endless tension means are shorter than and are taut relative to the belt proper.

5. The apparatus of claim 1, wherein the outer belt is a troughing belt, means are provided for troughing said outer belt in advance of the lower end of the guide member, said troughing belt having its mid-portion corrugated relative to its lateral margins.

6. The apparatus of claim 1, wherein the guide member is a slide plate.

7. Conveyor apparatus, comprising a closing belt; a guide member having an elongate, longitudinally arcuate, convex, guide surface engaging the inner side of said closing belt and defining a particular conveying path of travel; a troughing belt engaging the outer side of said closing belt during its travel through said particular path; and means for pulling said troughing belt toward said closing belt and said guide member, said troughing belt being formed with taut lateral margins and a relatively relaxed mid-portion, whereby the tension of said pulling means is exerted predominantly on said taut margins for creating respective lines of contact sealing engagement between said belts during their travel through said particular path, said relaxed mid-portion thereby being relatively free to expand longitudinally while traversing said particular path of travel.

8. An endless troughing belt for material-conveying purposes, characterized by taut lateral margins and a relatively relaxed mid-portion, said belt comprising endless tension means which are shorter than the belt proper and are embedded in the lateral margins of said belt proper and are responsible for the taut margins of the belt.

References Cited in the file of this patent

UNITED STATES PATENTS

| | | |
|---|---|---|
| 785,569 | Plunket | Mar. 21, 1905 |
| 1,122,273 | Hansen | Dec. 29, 1914 |
| 1,215,739 | Stehli | Feb. 13, 1917 |
| 1,438,865 | Sargent | Dec. 12, 1922 |
| 1,484,248 | Austin | Feb. 19, 1924 |
| 1,695,272 | Christian et al. | Dec. 18, 1928 |
| 2,108,488 | Johns | Feb. 15, 1938 |
| 2,254,116 | Cooper et al. | Aug. 26, 1941 |
| 2,423,579 | Buren | July 8, 1947 |
| 2,642,178 | Naylor | June 16, 1953 |

FOREIGN PATENTS

| | | |
|---|---|---|
| 1,123,345 | France | June 11, 1956 |